United States Patent [19]
Maret

[11] Patent Number: 6,095,538
[45] Date of Patent: Aug. 1, 2000

[54] SUSPENSION SEAT POST FOR A BICYCLE SEAT

[76] Inventor: Kevin L. Maret, 348 Gaslight La., Lincoln, Nebr. 68521

[21] Appl. No.: 09/168,651

[22] Filed: Oct. 8, 1998

[51] Int. Cl.[7] .................... B62M 1/00; F16F 1/00
[52] U.S. Cl. ................ 280/220; 267/132; 297/209
[58] Field of Search .................... 267/132, 131, 267/153, 292, 293; 280/220, 275, 276, 283, 284, 281.1, 290; 297/209, 200, 199, 215.13, 215.14, 195.1

[56] References Cited

U.S. PATENT DOCUMENTS

| | | | |
|---|---|---|---|
| Re. 13,383 | 3/1912 | Harley | 297/209 |
| 575,815 | 1/1897 | Todd | 297/209 |
| 602,389 | 4/1898 | Whitlow | 297/209 |
| 686,156 | 12/1901 | Snyder | 280/283 |
| 886,227 | 4/1908 | Mamet et al. | 280/283 |
| 1,092,407 | 4/1914 | Smith | 297/209 |
| 1,120,379 | 12/1914 | Eplex | 297/209 |
| 2,107,561 | 2/1938 | Brandt et al. | 297/209 |
| 3,481,628 | 12/1969 | Brilando et al. | 297/209 |
| 3,891,236 | 6/1975 | Kuwano | 280/283 |
| 5,094,424 | 3/1992 | Hartway | 248/600 |
| 5,344,170 | 9/1994 | Ochoa | 280/283 |
| 5,704,626 | 1/1998 | Kesinger | 280/220 |
| 5,881,988 | 3/1999 | Liu | 267/132 X |

*Primary Examiner*—Robert J. Oberleitner
*Assistant Examiner*—Pamela J. Lipka
*Attorney, Agent, or Firm*—Zarley, McKee, Thomte Voorhees & Sease; Dennis L. Thomte

[57] ABSTRACT

A suspension seat post for a bicycle comprising a tubular housing having a cylindrical bore formed therein which has upper and lower bushings positioned therein with the upper and lower bushings having hexagonal bores extending therethrough. A hexagonal slider extends downwardly through the hexagonal bores in the upper and lower bushings. A bolt extends upwardly through the lower end of the lower bushing and is secured to the lower end of the hexagonal slider for movement therewith. As the hexagonal slider moves downwardly, a plurality of elastomeric members, positioned below the lower bushing and the lower end of the lower housing, are compressed. A lock ring is threadably secured to the upper end of the upper bushing and the tightening thereof brings the lock ring into engagement with the upper end of the tubular housing to thereby slightly turn the upper bushing to draw the planar surfaces of the hexagonal bore therein into engagement with the hexagonal slider, thereby reducing objectionable side-to-side seat movement.

3 Claims, 5 Drawing Sheets

SUSPENSION SEAT POST FOR A BICYCLE SEAT

BACKGROUND OF THE INVENTION

1. Field of the Invention

This invention relates to a seat post for a bicycle seat and more particularly to a suspension seat post for a bicycle seat having means for preventing side-to-side seat travel.

2. Description of the Related Art

Many types of suspension seat posts have been previously provided for bicycle seats in an effort to reduce the shock imparted to the rider's seat. In the past, the majority of the suspension seat posts utilized a slider which was slidably mounted in a tubular member which in turn was inserted into the bicycle frame. Usually, elastomeric damping members were positioned between the lower end of the slider and the lower end of the tubular housing with the elastomeric members being compressed by the slider as relative movement occurred between the slider and the tubular member in which it was slidably received. A seathead base is secured to the upper end of the slider to which the bicycle seat is attached. If the slider is cylindrical in design and is slidably received in a cylindrical housing, it is very difficult to prevent side-to-side seat travel. In an attempt to reduce or eliminate the side-to-side seat travel, sliders having a hexagonal or non-round cross-section have been provided which were slidably received in bushings having hexagonal or non-round bores extending therethrough with the bushings being secured or positioned in a tubular housing. Although the hexagonal and non-round sliders did reduce side-to-side seat travel considerably, the machining of the same, as well as the production of the bushings, was difficult to control with the finished product still suffering from some side-to-side seat travel. The side-to-side seat travel also increases as the bushings become worn through use.

Heretofore, the inventor herein utilized spaced-apart upper and lower bushings positioned in a tubular housing with the upper and lower bushings having hexagonal or non-round bores formed therein which receive a hexagonal or non-round slider. Applicant provided external threads on the upper bushing with those external threads being slightly exposed above the upper end of a tubular housing. A lock ring was threadably mounted on the upper end of the upper bushing and was tightened into engagement with the upper end of the tubular member to slightly turn the planes of the upper bushing into frictional engagement with the planar surfaces of the hexagonal or non-round slider to reduce side-to-side seat movement. However, careless tightening or over-tightening of the lock ring on the upper end of the upper bushing resulted in the upper bushing becoming inoperative in a fairly short time.

SUMMARY OF THE INVENTION

A suspension seat post for a bicycle seat is disclosed which includes a tubular housing having a cylindrical bore formed therein which extends between the upper and lower ends thereof. A preload end cap is threadably mounted in the lower end of the tubular housing which is positioned below a plurality of elongated elastomer damping members positioned in the tubular housing. A lower bushing is mounted in the cylindrical bore of the tubular housing above the upper end of the damping members and has a hexagonal bore formed therein. An upper bushing is positioned in the upper end of the tubular member and has an externally threaded portion at its extreme upper end which is exposed above the tubular member. The upper bushing has a cylindrical bore extending therethrough which receives a plastic insert therein with the insert having a hexagonal bore extending therethrough. An elongated hexagonal slider extends downwardly through the upper and lower bushings and has a seathead base at its upper end adapted to have a bicycle seat secured thereto. A bolt extends upwardly through the lower end of the lower bushing and is threadably received by the lower end of the hexagonal slider. An upper bushing lock ring is threadably mounted on the upper outer end of the upper bushing and is drawn into engagement with the upper end of the tubular housing and slightly distorts the upper bushing and the insert therein to bring the planar surfaces of the hexagonal bore in the upper bushing insert into engagement with the planar surfaces of the hexagonal slider, thereby reducing side-to-side seat travel. As the inserts become worn, the upper bushing lock ring may be further tightened to further distort the upper bushing and the insert therein.

Although hexagonal bores and sliders are described, any configuration other than round may be utilized, although hexagonal is the preferred configuration.

It is therefore a principal object of the invention to provide an improved suspension seat post for a bicycle seat.

Still another object of the invention is to provide a suspension seat post including means for reducing side-to-side seat travel.

Still another object of the invention is to provide a suspension seat post having means to compensate for bushing wear.

Yet another object of the invention is to provide a suspension seat post which is durable in use, refined in appearance and economical of manufacture.

These and other objects will be obvious to those skilled in the art.

DESCRIPTION OF THE PREFERRED EMBODIMENT

Figure 1:
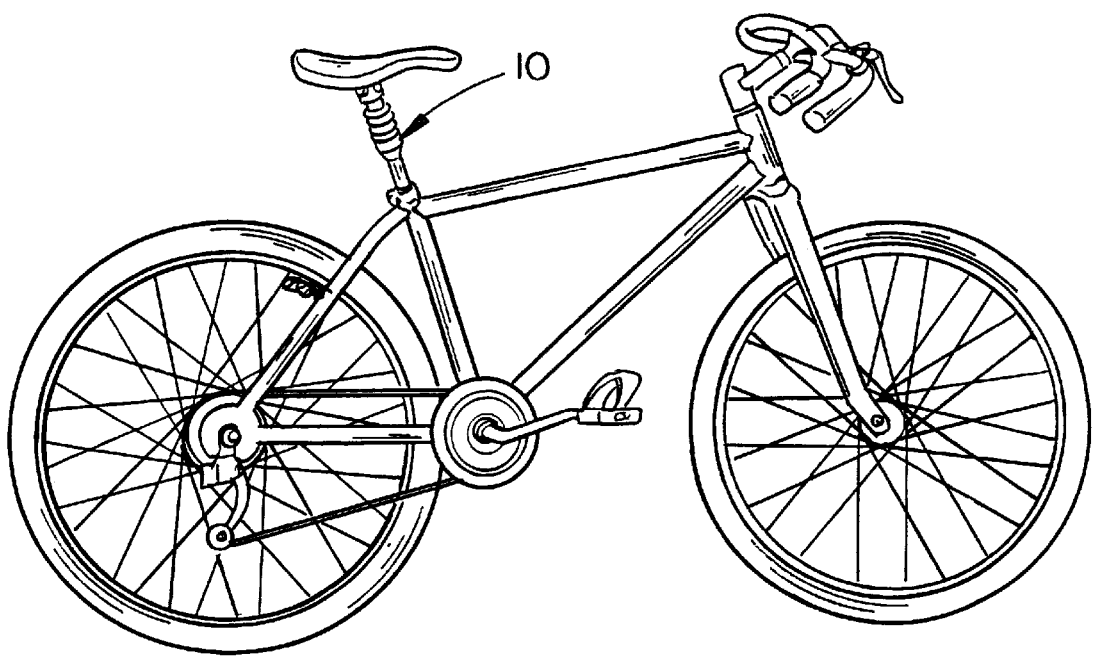
FIG. 1 is a view illustrating the suspension slot post of this invention mounted on a bicycle.
Figure 2:
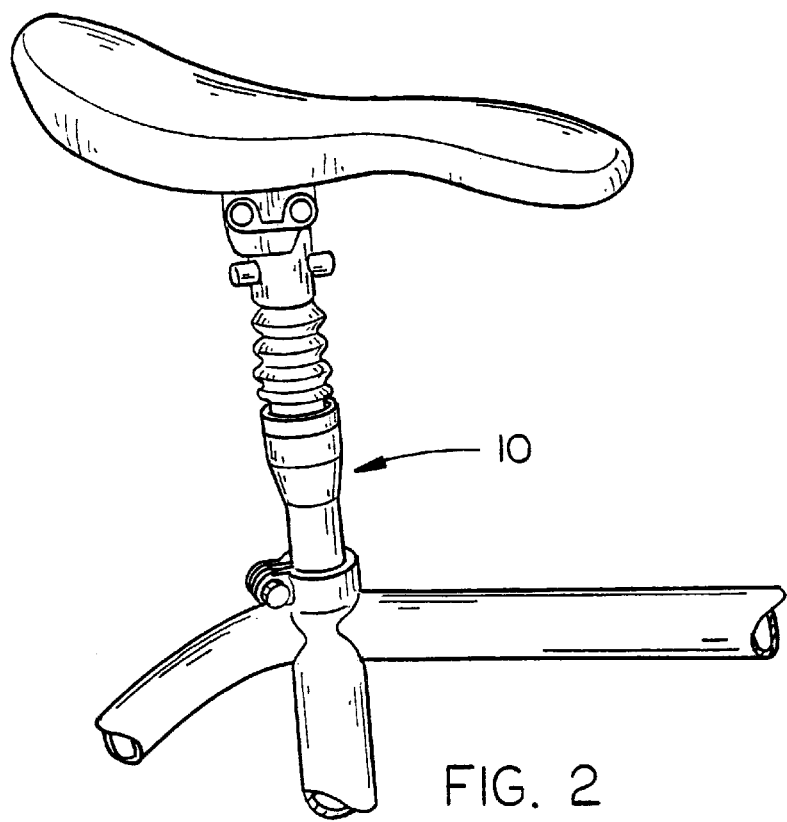
FIG. 2 is a partial enlarged view of FIG. 1.
Figure 3:
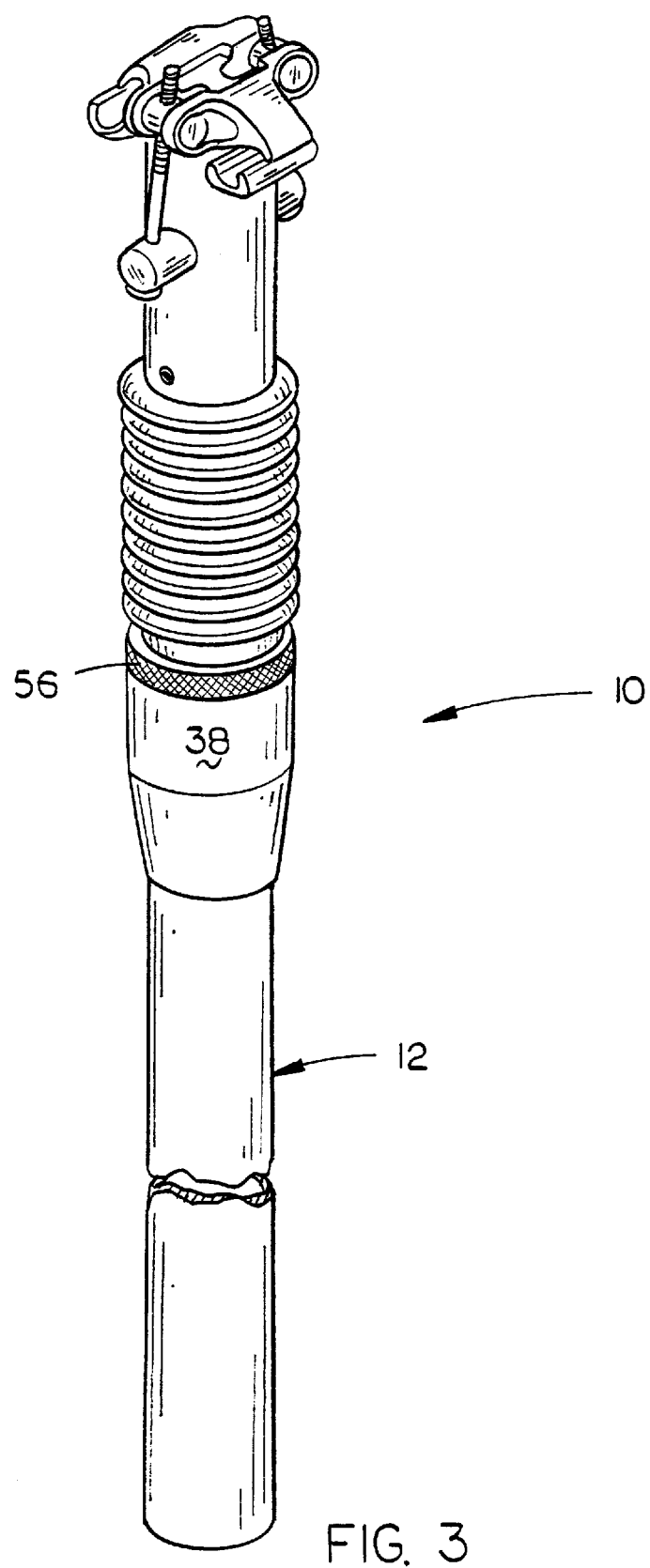
FIG. 3 is a perspective view of the suspension seat post of this invention.
Figure 4:
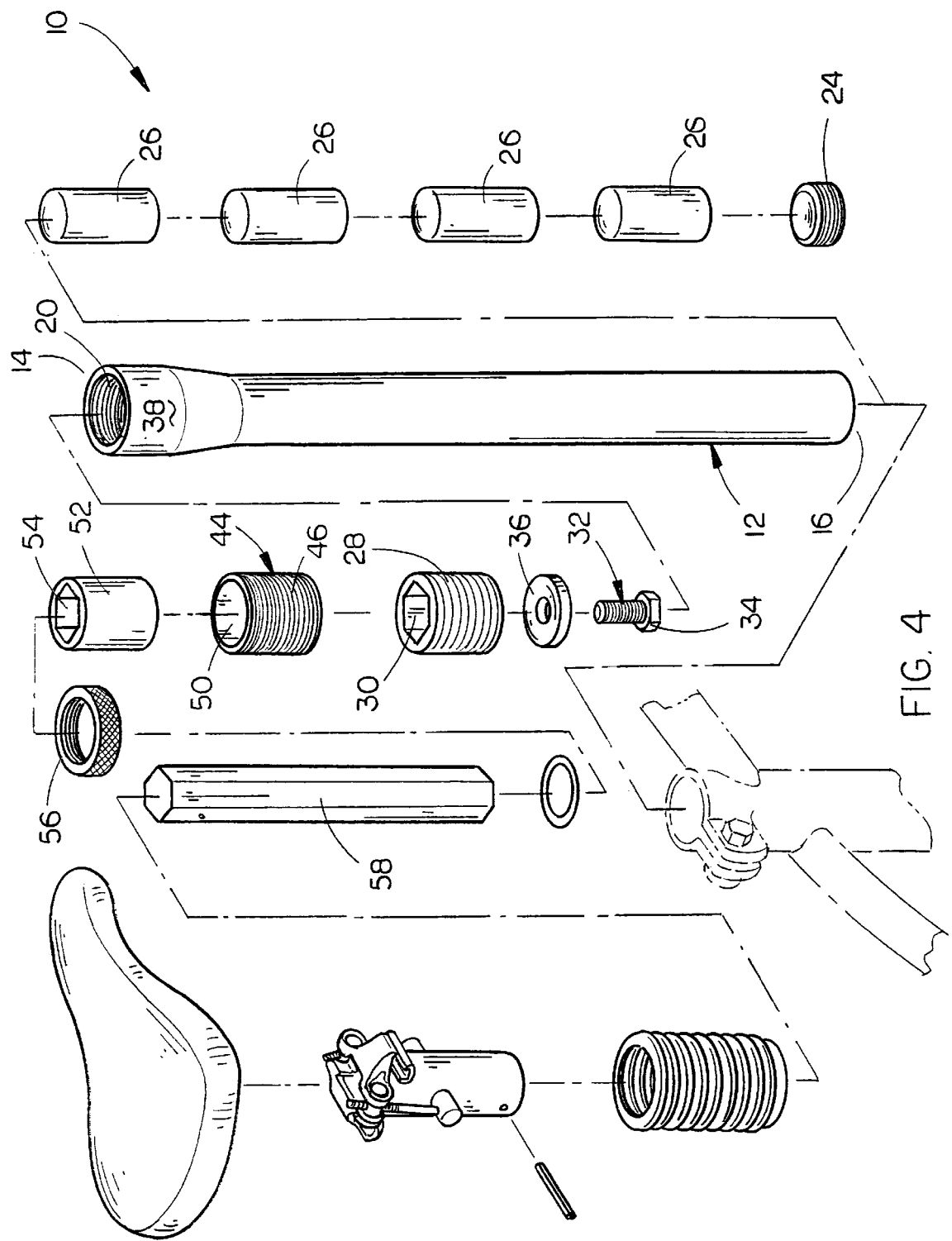
FIG. 4 is an exploded perspective view of the invention.
Figure 6B:
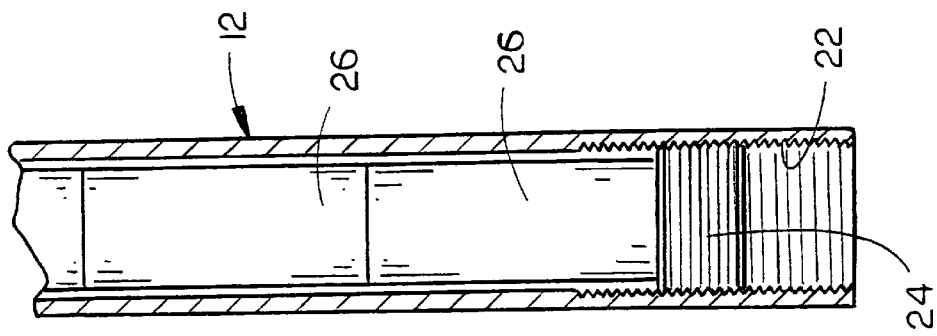
FIG. 6B is a view similar to FIG. 6A except that the preload end cap has been moved upwardly from the position of FIG. 6A.
Figure 6A:
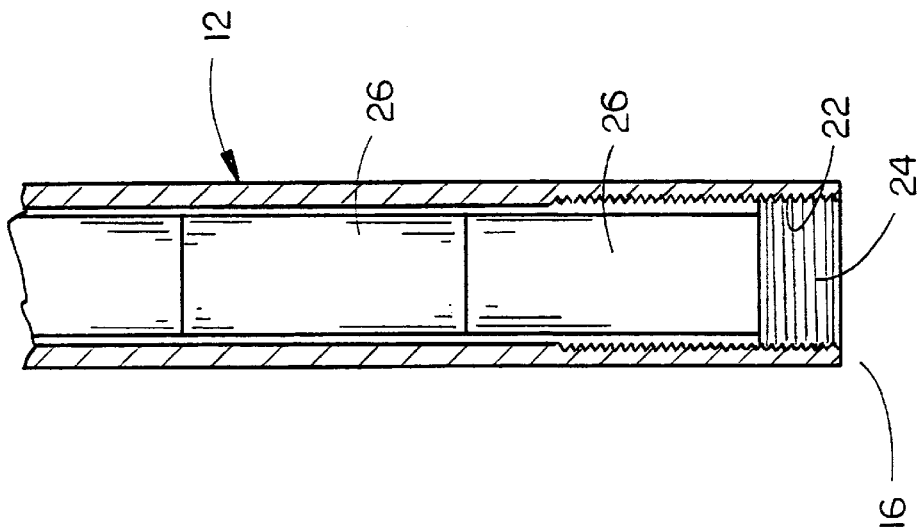
FIG. 6A is a partial vertical sectional view of the lower portion of the invention.
Figure 5:
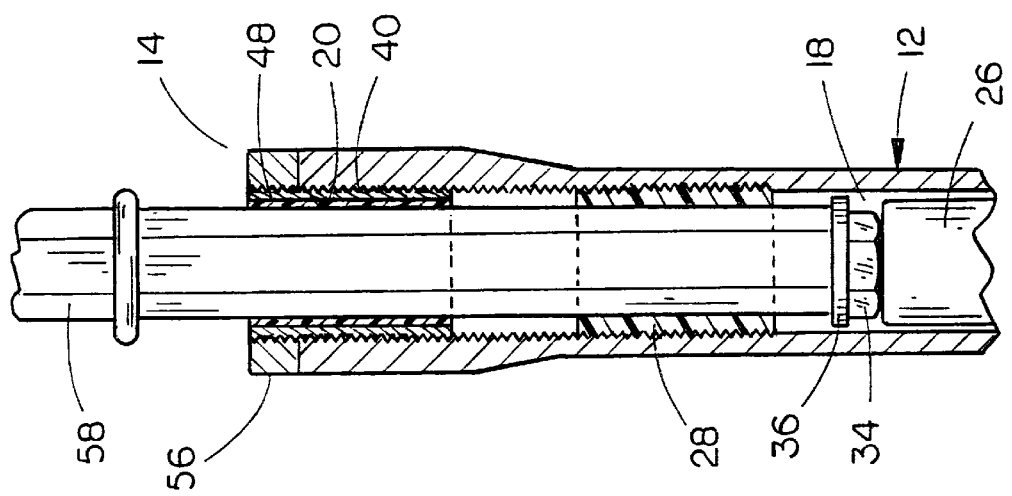
FIG. 5 is a partial vertical sectional view of the upper portion of the invention.
Figure 7:
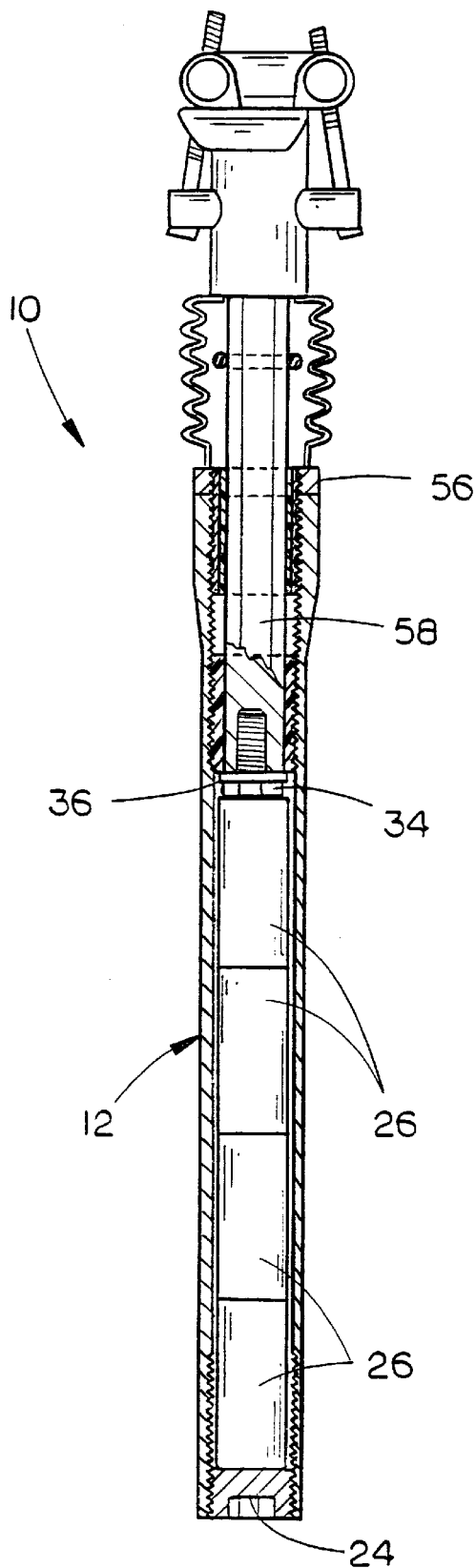
FIG. 7 is a vertical sectional view of the suspension seat post in its normal position.
Figure 8:
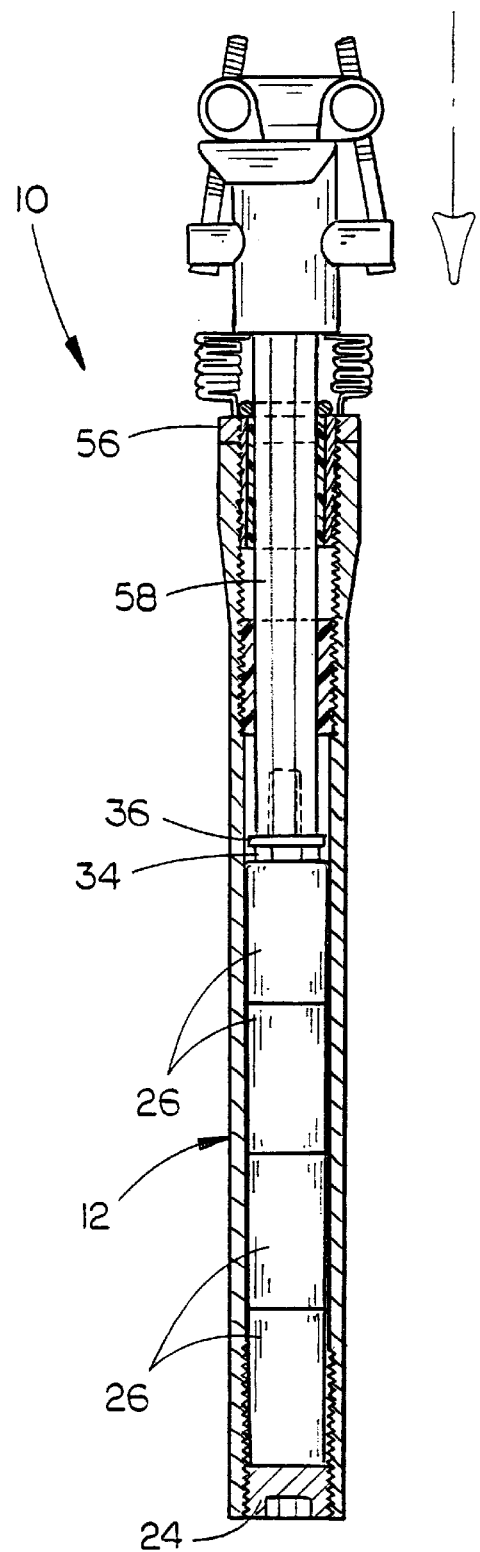
FIG. 8 is a vertical sectional view similar to FIG. 7 except that the slider has moved downwardly from the position of FIG. 7.

The suspension seat post of this invention is referred to generally by the reference numeral 10. Seat post 10 includes a lower housing 12 having an upper end 14 and a lower end 16. Lower housing 12 has a cylindrical bore 18 (FIG. 5) extending therethrough which has internally threaded portions 20 and 22 at its upper and lower ends, respectively. Preload end cap 24 is selectively threadably mounted in the lower threaded portion 22 and is designed to preload the elastomeric members 26 positioned in the lower housing 12 above end cap 24.

The numeral 28 refers to a lower bushing having a cylindrical outer surface to enable it to be positioned in bore 18 of lower housing 12. Lower bushing 28 is bonded to lower housing 12 to prevent rotational and longitudinal movement thereof. Lower bushing 28 is provided with a hexagonal bore 30 extending between the upper and lower ends thereof. The lower end of lower bushing 28 is adapted to have bolt 32 extending upwardly therefrom. As seen in the drawings, bolt 32 includes a head portion 34 and a top out washer 36 which is positioned between head 34 and the lower end of lower bushing 28.

Although tubular lower housing 12 may be of one-piece construction, it is preferred that a sleeve 38 be secured to the upper end of lower housing 12, as illustrated in the drawings. Obviously, the sleeve 38 and the tubular portion of the lower housing 12 could be of one-piece milled construction. Whether the sleeve 38 is secured to the upper end of the lower housing 12 or is a unitary part thereof, sleeve 38 has a cylindrical bore 40 extending therethrough, the upper end of which is provided with the internal threads 20. The numeral 44 refers to a metal upper bushing having external threads 46 which enable bushing 44 to be threadably inserted into the upper end of the sleeve 38. The bushing 44 is inserted into the sleeve 38 so that a portion of the exterior threads at the upper end of the bushing 44 are exposed above the sleeve 38 and which are referred to generally by the reference numeral 48. The metal bushing 44 has a cylindrical bore 50 extending therethrough which has a thermoplastic insert 52 mounted therein and which is bonded thereto. Insert 52 is provided with a hexagonal bore 54 extending therethrough which is aligned with the hexagonal bore 30 in lower bushing 28.

The numeral 56 refers to a upper bushing lock ring which is adapted to be threadably mounted on the exposed threads 48. An elongated hexagonal slider 58 extends downwardly through hexagonal bores 54 and 30 and has its lower end positioned in the lower end of lower bushing 28. Bolt 32 is threadably secured to the lower end of slider 58 for movement therewith. Thus, downward movement of slider 58 causes head 34 of bolt 32 to engage and compress the elastomeric members 26 in customary fashion. Upward movement of the slider 58 is limited by the engagement of the top out washer with the lower end of lower bushing 28.

The hexagonal configuration of the slider 58 interacts with the hexagonal bores 30 and 54 to limit the side-to-side (rotational) movement of the slider and the seat attached thereto. Due to the difficulties in machining the hexagonal slider 58 and the hexagonal bores 30 and 54, there will be a small amount of side-to-side "play" between the hexagonal slider 58 and the hexagonal bores 30 and 54. The tightening of the lock ring 56 on threads 48 causes the lock ring 56 to engage the upper end of the sleeve 38 to slightly turn the metal upper bushing 44 and the insert 52 therein to turn the planar surfaces of the hexagonal bore 54 into engagement with the hexagonal planar surfaces of the hexagonal slider 58 to increase the frictional engagement therebetween to reduce or eliminate objectionable side-to-side seat movement.

Although hexagonal bores and surfaces have been described, it should be noted that other non-round configurations could be used such as triangular, quadrilateral; etc.

Thus it can be seen that a novel suspension seat post has been provided which eliminates or reduces objectionable side-to-side seat movement and which may be further tightened, after the parts have become worn, to again reduce or eliminate objectionable side-to-side seat movement.

Thus it can be seen that the invention accomplishes at least all of its stated objectives.

I claim:

1. A suspension seat post for a bicycle seat, comprising:

a tubular housing having upper and lower ends;

said tubular housing having a cylindrical bore formed therein extending between its upper and lower ends;

said cylindrical bore having a first internally threaded portion at its lower end;

said cylindrical bore having a second internally threaded portion at its upper end;

a preload end cap, having upper and lower ends, threadably mounted in said first internally threaded portion;

at least one elongated damping member in said cylindrical bore above said end cap;

said damping member having upper and lower ends;

said upper end of said end cap being in engagement with said lower end of said damping member;

a cylindrical lower bushing, having upper and lower ends, positioned in said cylindrical bore below the upper end thereof;

said lower bushing being fixed into position in said cylindrical bore against rotational and longitudinal movement;

said lower bushing having a hexagonal bore extending therethrough between its upper and lower ends;

an externally threaded, cylindrical upper bushing, having upper and lower ends; threadably mounted in said second internally threaded portion;

said upper end of said upper bushing being positioned above said upper end of said tubular housing to expose a portion of external threads on said upper bushing;

said upper bushing having a cylindrical bore formed thereon which extends between the upper and lower ends thereof;

said upper bushing being comprised of a metal material;

a cylindrical insert positioned in and fixed to said cylindrical bore in said upper bushing and having upper and lower ends;

said cylindrical insert having a hexagonal bore formed therein which extends between the upper and lower ends thereof;

an elongated hexagonal slider, having upper and lower ends; slidably extending downwardly through said hexagonal bore in said insert in said upper bushing and through said hexagonal bore in said lower bushing;

a bolt means, having upper and lower ends, extending upwardly through said lower bushing and being threadably secured to said lower end of said hexagonal slider for movement therewith;

said lower end of said bolt means being in engagement with said upper end of said damping member;

a seathead base secured to the upper end of said hexagonal slider and being adapted to have a bicycle seat secured thereto;

and an upper bushing lock ring threadably mounted on said upper bushing and being threadably moveable into frictional locking engagement with the upper end of said tubular housing to slightly turn said upper bushing and insert therein into engagement with the exterior of said slider thereby reducing side-to-side seat travel.

2. A suspension seat post for a bicycle seat, comprising:

a tubular housing having upper and lower ends;

said tubular housing having a cylindrical bore formed therein extending between its upper and lower ends;

said cylindrical bore having a first internally threaded portion at its lower end;

said cylindrical bore having a second internally threaded portion at its upper end;

a preload end cap, having upper and lower ends, threadably mounted in said first internally threaded portion;

at least one elongated damping member in said cylindrical bore above said preload end cap;

aid damping member having upper and lower ends;

said upper end of said end cap being in engagement with said lower end of said damping member;

a cylindrical lower bushing, having upper and lower ends, positioned in said cylindrical bore below the upper end thereof;

said lower bushing being fixed into position in said cylindrical bore against rotational and longitudinal movement;

said lower bushing having a non-round bore extending therethrough between its upper and lower ends;

an externally threaded, cylindrical upper bushing, having upper and lower ends; threadably mounted in said second internally threaded portion;

said upper end of said upper bushing being positioned above said upper end of said tubular housing to expose a portion of external threads on said upper bushing;

said upper bushing having a cylindrical bore formed thereon which extends between the upper and lower ends thereof;

said upper bushing being comprised of a metal material;

a cylindrical insert positioned in and fixed to said cylindrical bore in said upper bushing and having upper and lower ends;

said cylindrical insert having a non-round bore, which matches the non-round bore in said lower bushing, formed therein which extends between the upper and lower ends thereof;

an elongated non-round slider, having upper and lower ends; slidably extending downwardly through said non-round bore in said insert in said upper bushing and through said non-round bore in said lower bushing;

a bolt means, having upper and lower ends, extending upwardly through said lower bushing and being threadably secured to said lower end of said non-round slider for movement therewith;

said lower end of said bolt means being in engagement with said upper end of said damping member;

a seathead base secured to the upper end of said non-round slider and being adapted to have a bicycle seat secured thereto;

and an upper bushing lock ring threadably mounted on said upper bushing and being threadably moveable into frictional locking engagement with the upper end of said tubular housing to slightly turn said upper bushing and insert therein into engagement with the exterior of said slider thereby reducing side-to-side seat travel.

3. A suspension seat post for a bicycle seat, comprising:

a tubular housing having upper and lower ends;

said tubular housing having a cylindrical bore formed therein extending between its upper and lower ends;

said cylindrical bore having a first internally threaded portion at its lower end;

said cylindrical bore having a second internally threaded portion at its upper end;

a preload end cap, having upper and lower ends, threadably mounted in said first internally threaded portion;

at least one elongated damping member in said cylindrical bore above said preload end cap;

said damping member having upper and lower ends;

said upper end of said end cap being in engagement with said lower end of said damping member;

a cylindrical lower bushing, having upper and lower ends, positioned in said cylindrical bore below the upper end thereof;

said lower bushing being fixed into position in said cylindrical bore against rotational and longitudinal movement;

said lower bushing having a non-round bore extending therethrough between its upper and lower ends;

an externally threaded, cylindrical upper bushing, having upper and lower ends; threadably mounted in said second internally threaded portion;

said upper end of said upper bushing being positioned above said upper end of said tubular housing to expose a portion of external threads on said upper bushing;

said upper bushing having a non-round bore formed thereon which extends between the upper and lower ends thereof;

said upper bushing being comprised of a metal material;

a cylindrical insert positioned in and fixed to said cylindrical bore in said upper bushing and having upper and lower ends;

said cylindrical insert having a non-round bore, which matches the non-round bore in said lower bushing, formed therein which extends between the upper and lower ends thereof;

an elongated non-round slider, having upper and lower ends; slidably extending downwardly through said non-round bore in said insert in said upper bushing and through said non-round bore in said lower bushing;

a bolt means, having upper and lower ends, extending upwardly through said lower bushing and being threadably secured to said lower end of said non-round slider for movement therewith;

said lower end of said bolt means being in engagement with said upper end of said damping member;

a seathead base secured to the upper end of said non-round slider and being adapted to have a bicycle seat secured thereto;

and an upper bushing lock ring threadably mounted on said upper bushing and being threadably moveable into frictional locking engagement with the upper end of said tubular housing to slightly turn said upper bushing and insert therein into engagement with the exterior of said non-round slider thereby reducing side-to-side seat travel.

* * * * *